United States Patent [19]
Dufour

[11] Patent Number: 5,710,090
[45] Date of Patent: Jan. 20, 1998

[54] CONTROLLEDLY PERMEABLE/ CRISTOBALITE-FREE DIATOMACEOUS FILTERING AGENTS

[75] Inventor: Pascal Dufour, Asnieres/Seine, France

[73] Assignee: Ceca S.A., Puteaux, France

[21] Appl. No.: 343,979

[22] Filed: Nov. 18, 1994

[30] Foreign Application Priority Data

Nov. 19, 1993 [FR] France ................................. 93 13862

[51] Int. Cl.$^6$ ............................ B01J 20/10; C01B 33/20
[52] U.S. Cl. ................................. 502/412; 423/326
[58] Field of Search .......................... 502/412; 423/326

[56] References Cited

U.S. PATENT DOCUMENTS

| | | |
|---|---|---|
| 2,693,456 | 11/1954 | Fennell. |
| 4,581,338 | 4/1986 | Robertson et al. ................... 502/8 |
| 5,179,062 | 1/1993 | Dufour ............................... 502/412 |
| 5,403,799 | 4/1995 | Miller et al. ....................... 502/64 |

FOREIGN PATENT DOCUMENTS

| | | |
|---|---|---|
| 463927 | 1/1992 | European Pat. Off. . |
| 907690 | 6/1990 | France. |
| 465918 | 1/1969 | Switzerland. |

OTHER PUBLICATIONS

Erzmetall, vol. 39, No. 4, Apr. 1986, Weinheim, De, pp. 158-162, S. Paschen "Kieselgur-Gewinnung, Aufbereitung und Verwendung", pp. 160-161.

*Primary Examiner*—Walter D. Griffin
*Assistant Examiner*—In Suk Bullock
*Attorney, Agent, or Firm*—Burns, Doane, Swecker & Mathis, L.L.P.

[57] ABSTRACT

Unique pink/salmon diatomite agglomerates, well suited as filtering agents/aids, have a cristobalite content of less than 1.5%, a permeability ranging from 20 to 500 millidarcys, a cake density of less than 0.400 g/cm$^3$, and are prepared by homogeneously intimately admixing a diatomite with a binder solution of silicic acid or of an alkali metal silicate, drying and optionally gently grinding the agglomerates thus formed, and then calcining the agglomerates at a temperature no greater than 850° C., preferably no greater than 600° C.

7 Claims, No Drawings

CONTROLLEDLY PERMEABLE/CRISTOBALITE-FREE DIATOMACEOUS FILTERING AGENTS

BACKGROUND OF THE INVENTION

1. Field of the Invention

The present invention relates to the preparation of novel diatomite-based filtering agents essentially devoid of cristobalite values and having controlled permeability.

2. Description of the Prior Art

Diatomites are siliceous sedimentary rocks which are produced by accumulation of fossilized diatom remains over the course of geological periods and especially in the tertiary era and the quaternary era.

Diatoms are single-cell algae which have developed and are still presently developing in lakes, rivers or seas. Their protective coats comprise a siliceous skeleton, the shape of which varies widely, resembling rosettes, combs, mats, sleeves, and the like, but always comprising cells and channels of very great fineness.

Diatomites are thus siliceous rocks of very low density and have a specific surface ranging from 1 to 40 $m^2/g$, properties that are unique and for which many industrial applications of the diatomaceous earths have long been known, notably as filtering agents, as finely divided fillers for paints, as absorbents and catalyst supports, and the like.

For the production of filtering agents the diatomite is subjected to various preliminary treatments, for example crushing, drying, grinding, removal of coarse impurities (basalt, clays, sand and the like). It is then subjected to a significant calcining treatment to decrease the moisture content thereof from sixty to approximately one percent, to burn off the organic matter contained therein and to convert same into oxides, silicates or silicoaluminates, as well as to sinter certain undesirable inorganic compounds which commonly accompany silica, such as calcium carbonate, calcium sulfate, iron derivatives and possibly sulfides.

Industry requires filtering agents having a wide range of permeabilities. The common unit of permeability is the darcy, permeability of a porous bed 1 cm in height and 1 $cm^2$ in section, through which a liquid whose viscosity is 1 mPa.s (or 1 centipoise) flows at a flow rate of 1 $cm^3$/second under an applied pressure differential of 1 atmosphere; one darcy is equivalent to $0.987 \cdot 10^{-22} m^2$, namely, approximately 1 $pm^2$. Industrial filtering agents, also referred to as filter aids, have permeabilities which generally range from 20 millidarcys to 15 darcys, markedly higher than those of the diatomites comprising the starting raw materials therefor.

It has long been known to control this permeability via calcining of the diatomites at a sufficiently high temperature, because this causes agglomerating of the diatoms and their debris a few micrometers in length into aggregates of 10 μm or greater. This is a partial agglomeration which can be controlled such as to avoid the complete fusion of the diatom skeletons and the formation of aggregates larger than 50 μm in size. These larger aggregates present the serious disadvantage of settling or depositing at the lower ends of pipes or filters during filtration operations. The diatoms which are thus damaged and which have become excessively agglomerated hard silica particles must be ground, but this adversely increases the "cake density" of the final product. Such "cake density" is an important characteristic of filtering agents; it is the apparent dry density of the bed of filtering agent which remains on a Büchner filter after the filtration of a liquid in which the filtering agent has been suspended beforehand. It is considered that the "cake density" of the diatomite-based filtering agent must remain lower than 0.40 $g/cm^3$. Higher densities correspond to excessively melted or excessively ground products which for the most part have lost their initial porous structure; maintaining such products in suspension becomes increasingly difficult. The use of filtering agents of a density higher than 0.045 $g/cm^3$ is rare, excepting regenerated filtering agents, and even in this event, it is desirable to admix same with at least 20% of fresh charge.

Grinding presents the disadvantage of always increasing the "cake density." Thus, only a product whose initial cake density is as low as possible is advantageously ground. Grinding also very appreciably increases the fines content, the excessive fineness of which will be a source of filter plugging and a source of undesirable turbidity of the filtering liquids. This fines content has to be reduced by difficult and costly posttreatments.

Calcining and grinding followed by classification have long been considered essential parameters in the process for the manufacture of diatomite-based filtering agents. While such manufacturers are well skilled in calcining in a rotary kiln, this nevertheless entails calcining in bulk and in the presence of a flame whose heat transmission is extremely irregular, as a result of which not all of the diatomaceous material is subjected to treatment. If it is intended that the heat treatment be carried out completely throughout the mass at a fixed minimum temperature and for a sufficient period of time for the desired agglomeration to be attained, necessarily a portion or fraction of such mass will have experienced a surface overcalcining, which is remedied by regrinding. However, such high temperature treatment presents another disadvantage.

It has been reported (Deer, 1966; Kadey, 1975) that, while cristobalite is present in diatomite earths in amounts which can undoubtedly vary depending on the deposits, but which are generally less than 1%, it is present to a greater extent (at the same time as tridymite, but to a lesser degree) after thermal conversion of the amorphous silica which constitutes the major fraction of the skeleton of the diatoms. The cristobalite content in the products obtained by simple calcining, filtering agents having a pink color, ranges from 1% to 100% depending on the raw material therefor and the calcining temperature; it attains a value of 40% to 80% in the co-called white filtering agents, resulting from calcining in the presence of fluxes such as sodium carbonate.

Inhalation of crystalline silica dust has been recognized as perhaps contributing to silicosis, a serious lung disease. A monograph of the International Agency for Research on Cancer (IARC), "Evaluation of Carcinogenic Risks of Chemicals to Humans, Silica and Some Silicates," volume 42 (1987), has condemned crystalline silica as a potential carcinogenic agent. While this has been vigorously disputed, and although the very complex legislation which governs the working conditions of personnel exposed to the risks of inhalation of crystalline silica dust may be strictly enforced, a desideratum in this art is to limit the amount of crystalline silica in the diatomite-based filtering agent marketed to the agro/foodstuffs industry.

In the conventional processes for the production of filtering agents, the calcination is in actual practice carried out at temperatures of from 900° to 1,200° C. to provide the agglomeration required to obtain a range of filtering agents having a permeability of from 20 millidarcys to 15 darcys. Of course, when using raw materials which are rich in iron, sodium and calcium, the superficial fusions obviously promote the desired agglomeration, but they also trigger the rapid crystallization of silica as cristobalite. Below 600° C. this crystallization is extremely slow, up to 850° C. it remains low, but it increases very rapidly at temperatures above 900° C.

It is considered that the critical amount of impurities which catalyze the aforesaid crystalline transformation is on the order of 1%, and this content is practically always attained and exceeded in diatomites. The result is that in the long-established conventional calcination processes, where the residence times at high temperature are necessarily longer than a few seconds, or even a few minutes, massive formation of cristobalite is not avoided. This is the cake, in particular, in industrial rotary kilns, generally of great length (30 meters and more), which operate at temperatures ranging from 1,000° C. to 1,200° C. (see, for example, William Q. Hull, "Diatomaceous Earth," in *Industrial and Engineering Chemistry*, pp. 256–269 (Feb. 1953)).

Given those instances where cristobalite does not exist, industrial processes entailing partial agglomeration by calcining provides acceptable solutions for the production of filtering agents having controlled porosity and cake density. This has been the case with the calcination processes well known to this art, especially those employing straight ovens with superposed trays, traditional processes for calcining in rotary kilns, the so-called fluid-bed furnaces, all of which are calcination techniques in which the minimum residence time is on the order of a few minutes. It is not possible to carry these processes out below 850° C., the temperature below which no agglomeration occurs. At the outlet of the furnace a product is therefore recovered whose permeability would appear to depend only on the raw material, namely, on the initial particle size of the raw starting material. Selecting and recovering from a quarry only those raw materials that produce a particular final product would result in a great waste of raw materials which otherwise would be suitable, if only they were agglomerated.

More refined processes, such as those described in French Patent No. 2,586,588, East German Patent DD-266,043, and, more recently, French Patent No. 9,007,690, employ furnaces containing turbulent beds or a spiralling gas stream, which certainly permit better control over the thermal history of the diatomite, as well as a better control, both over the crystallization of amphorous silica and over the agglomeration of the particles. Nonetheless, these latter techniques remain lacking in respect of the essential requirements of production safety and of industrial economy.

Thus, serious need continues to exist in this art for diatomite-based filtering agents having a cristobalite content lower than 1.5% and having controlled permeability and cake density. To this end, it has been considered to produce diatomite-based filtering agents without ever subjecting them to temperatures higher than 850° C., preferably 600° C., by agglomerating same using an inorganic or organic binder. In the case of an inorganic binder, the binder would be sprayed onto the preground and purified diatomite and the calcination of the powder would then be carried out at a temperature lower than 850° C., preferably lower than 600° C., after appropriate blending and drying.

In the case of an organic binder, the diatomite would first be calcined at a temperature lower than 850° C., preferably lower than 600° C., and then the binder would be sprayed and the powder blended and dried under appropriate conditions for setting the binder. This "binder" principle presents the difficulty of creating and maintaining a sufficient porosity in the bound masses, because it is to be expected that, on becoming attached in the intergranular spaces of the powder, the binders, on the one hand, block the intergranular porosity and, on the other, increase the cake density. This is indeed the case using traditional binders, in particular clay binders or silica sols.

SUMMARY OF THE INVENTION

It has now unexpectedly been found that suitable filtering agents can be prepared by agglomeration of diatomites using binders comprising aqueous solutions of alkali metal silicates or of silicic acid.

Briefly, the present invention features the preparation of novel filtering agents by spraying the aforesaid silicate or siliceous binder solutions onto the diatomite, next intimately blending the resulting mixture, drying the agglomerated mass thus obtained, optionally lightly or mildly grinding the dried material, and then thermally activating same at a temperature not exceeding 850° C., preferably not exceeding 600° C.

DETAILED DESCRIPTION OF BEST MODE AND PREFERRED EMBODIMENTS OF THE INVENTION

More particularly according to the present invention, the amounts of silicic binder employed (silicic acid or silicate) advantageously ranges from 0.1 to 5 g of anhydrous silicic acid per 100 g of diatomite in the case of a silicic acid bonding agent and from 0.1 to 15 g of silica per 100 g of diatomite in the case of a silicate bonding agent.

It is observed that the filtering agents according to the invention prepared using sodium silicate have a marked tendency to release sodium into the filtrate liquors. In certain instances this may be a disadvantage which the products obtained using silicic acid do not exhibit. Agglomeration with silicic acid is an all the more preferred embodiment of the invention, as its cost is identical with that of agglomeration with silicates.

The silicic acid employed per the present invention is prepared according to the reaction: $Na\text{—}O\text{-}(Si(OH)_2O\text{—})_nNa + 2R^-H^+ \rightarrow H\text{—}O(Si(OH)_2O)_nH + 2R^-Na^+$, in which n ranges from 1 to 4 and $R^-H^+$ and $R^-Na^+$ respectively represent a sulfonic or carboxylic resin in its acidic or sodium form.

Not all of the forms of silicic acid are equally as effective according to this invention, because their agglomeration power is very dependent upon the particular process for the preparation thereof. The best results are obtained using silicic acid produced from sodium silicate, in which the sodium ions are exchanged on cationic resins of a strong acid. Cationic resins of weak acids, while permitting preparation of silicic acid, do not impart thereto a sufficient agglomeration power. Silicic acids prepared on sulfonic resins, for example Amerblite IR 120, Lewatit S 100, Dowex HCR, Kastel C 300 and Relite CF are particularly useful. It should be noted that silicic acid is not storage-stable for more than 24 hours; after this time period gelling or gelation occurs, and this destroys all of the agglomerating power thereof. It must, therefore, be prepared at the situs and point in time of use.

Blending of the diatomite/silicic acid mixture is a particularly important parameter of the present invention. It indeed is required for proper agglomeration, i.e., to distribute the binder uniformly and thus to provide a maximum number of points of contact between each of the diatoms without risk of plugging of the intergranule space; in the absence of blending, namely, when the binder is merely sprayed, no increase in the permeability of the filtering agent is observed, but only an increase in the oversize on a 50 µm screen.

Excessive blending can be detrimental, specially when silicic acid is employed. Indeed with excess blending, the temperature of the powder increases and the silicic acid gels and loses a considerable percentage of its agglomerating power, while the gelled agglomerates are broken up and can longer agglomerate. In the case of the industrial blenders typically employed (for example Werner type blenders), a short period of time, on the order of some fifteen minutes, is a valid compromise between a sufficient distribution of the binder and an excessive heating of the mixture. In a blender controlled at a temperature of 25° C., this time period can obviously be exceeded without great disadvantage, except that of unnecessarily lengthening the duration of an industrial operation.

The powder thus prepared is next dried in the oven and then, if appropriate, lightly ground to remove the coarsest particles. It is then heated to 600° C. In the laboratory the period of exposure to this temperature is on the order of 45 minutes, a period which is appropriate on an industrial scale. It will be appreciated that if the industrial kiln is of appropriate length, the drying operation can be carried out at the inlet to the rotary kiln; in this instance a moderate grinding upon exiting the kiln is necessary to correct the oversize on the 50 µm screen.

The amounts of silicic binder to be employed advantageously range from 5% to 100%, namely, range from 5 to 100 g of silicic acid solution per 100 g of diatomite. There is no advantage in overloading the silica product with silicic acid, for two reasons. The first is quite simply economic. The second is that the objective is to prepare filtering agents having a very low cristobalite content and that the binder of the silicic acid is such as to generate cristobalite perhaps more easily than the amorphous silica of which the diatom remnants are composed, even at temperatures as low as 600° C. It will thus be seen from the examples to follow that the cristobalite content of the agglomerates increases slightly with the added silica, whereas it has been shown that a diatomite calcined at 600° C. for 45 minutes does not contain any cristobalite. A silica contribution of 5% by the silicic acid is considered very suitable for agglomeration and does not exceed the aforesaid standards of cristobalite amounts.

The filtering agents according to the invention are in that category known to this art as "pink" filtering agents, because the predominant tint of these products is in most instances pink, although salmon-colored products are in certain cases produced. This in contrast to the "white" or activated agents which, for their part, are prepared in the presence of fluxes, in particular sodium carbonate, and whose fine structure is profoundly impaired. These are products whose permeability range extends from 20 millidarcys to 500 millidarcys. The cake density of the diatomaceous materials of the invention is less than 0.400 g/cm³ and their oversize remaining on a 50 µm screen is less than 15%. The cristobalite content thereof, less than 1.5%, is a result of a calcination carried out at a temperature which is lower than 850° C., preferably at most 600° C. In most instances the subject filtering agents are produced directly, without grinding after calcination. Electron microscopy readily distinguishes these products from the thermal agglomerates known to the prior art; their binder contrasts with the fineness of the diatoms in its opalescent appearance and its smooth and full shape. The filtering agents of the present invention have BET specific surfaces which are greater than 10 m²/g because the porous surfaces of the diatoms are not modified or altered at 600° C.

In order to further illustrate the present invention and the advantages thereof, the following specific examples are given, it being understood that same are intended only as illustrative and in nowise limitative.

In said examples to follow, the characteristics and the basic technical properties of the filtering agents were determined as follows:

(1) The permeability was measured according to French experimental standard NFX 45-404 (1992);

(2) The 50 µm oversize was measured by depositing 10 g of powder onto a 50 µm screen according to DIN standard 4188 and then washing it with ordinary tap water until a clear water free of filtering agent passed therethrough. The material remaining on the filter was washed, dried and weighed and the weight recorded was normalized to 100 g of powder;

(3) The cake density was measured according to the technique of French experimental standard NFX-45-405 (1992);

(4) The weight loss on ignition (LI) was the loss in weight of a sample calcined at 900° C. for 1 hour;

(5) The cristobalite content was determined by means of X-ray diffraction;

(6) The EBC iron is the amount of iron extractable by a solution of potassium hydrogen phthalate according to international standard Analytica EBC—9.5 soluble iron, D 97 (F 97). See also Analytica EBC 7.8 determination of iron in beer, D 66 (F 66).

In the examples in which was present, the silicic acid was characterized by its solids content, determined on a solution thereof as silica separated in accordance with the reaction:

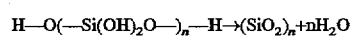

$$H-O(-Si(OH)_2O-)_n-H \rightarrow (SiO_2)_n + nH_2O$$

This solids content generally ranged from 0.1% to 6%.

EXAMPLE 1 (Comparative)

A diatomaceous earth obtained from the deposit at Saint Bauzile (Ardèche, France) was purified beforehand, namely, the inorganic impurities denser than the diatomite were separated by particle size selection in a cyclone equipped with a rotor. This diatomite was calcined at various temperatures ranging from 900° to 1,200° C., the residence time at these temperatures being from 30 to 40 minutes. This effected a degree of agglomeration. The filtering agents thus obtained had the characteristics reported in Table 1:

TABLE 1

| T° C° | β darcy | Dg g/cm³ | R₅₀ % | EBC iron ppm | BET m²/g | Cristobalite, % |
|---|---|---|---|---|---|---|
| 600° C. | 0.030 | 0.362 | 4 | 302 | 15 | <0.25 |
| 900° C. | 0.061 | 0.325 | 5 | 84 | 7.5 | 15 |
| 1,050° C. | 0.201 | 0.303 | 18.5 | 90 | 4 | 55 |

This Table clearly reflects the usual results, namely, that the grades with the lowest permeabilities of 0.030 to 0.090 darcys were obtained at temperatures of from 900° to 1,000° C., whereas the 0.090 to 0.400 darcy grades were obtained at temperatures between 1,000° and 1,200° C. It was also found that increasing the calcination temperature had the effect of increasing the cristobalite content. The high solubility of the iron in the products calcined below 900° C. was probably due to the large BET surface of the powder and also to an insufficient sintering of the impurities. It was observed that the agglomeration of the diatoms was very limited at temperatures below 850° C., taking account of the fact that the impurities present at the surface of the diatoms were no longer fusible enough to ensure interparticle bonding.

EXAMPLE 2

A filtering agent according to the invention was prepared by spraying silicic acid containing 4.25% of soluble silica onto the ground and purified diatomite of Example 1.

The silicic acid was prepared from sodium silicate exchanged on Amberlite IR 120 resin. 10 to 60 parts of aqueous solution were thus mixed with 100 parts of this raw material. The blending period required for a uniform distribution of the binder on the diatomite was 15 minutes. The powder was dried at 100℃. The dry product was gently ground to comminute a few large particles. The calcination was carried out at a temperature of 600° C. for 30–40 minutes. The characteristics of the products obtained after cooling on removal from the furnace are reported in Table 2 below:

TABLE 2

| % silicic acid | β darcy | Dg g/cm³ | R₅₀ % | EBC iron ppm | SiO₂ from the binder % | Cristo-balite, % |
|---|---|---|---|---|---|---|
| 0 | 0.030 | 0.362 | 4 | 302 | 0 | <0.25 |
| 10 | 0.060 | 0.332 | 4 | 127 | 0.42 | <0.25 |
| 20 | 0.091 | 0.320 | 6 | 156 | 0.85 | 0.5 |
| 30 | 0.125 | 0.310 | 8 | 124 | 1.3 | 0.7 |
| 40 | 0.180 | 0.325 | 11 | 150 | 1.7 | 1 |
| 50 | 0.229 | 0.340 | 15 | 174 | 2.1 | 1 |
| 60 | 0.308 | 0.345 | 25 | — | 2.5 | 1.2 |

From Table 2 it will be seen that when the binder content was increased, the permeability of the filtering agent increased without an increase in the cake densities, which remained lower than 0.40 g/cm³. The 50 μm oversize also increased, which is normal since agglomeration was carried out. As the cake density had not increased, it was very easy to reduce the 50 μm oversize by moderate grinding, without exceeding cake densities of 0.400 g/cm³.

The disappearance of iron, which was somewhat similar to that observed when the calcining temperature was increased, was noted. In this event it can only be an effect of the iron being masked by the silicic acid which, by covering a proportion of the ferric impurities, rendered same less accessible to the acidity in the EBC test.

EXAMPLE 3

The procedure of Example 2 was repeated using a different diatomite of very low permeability ($\beta_{(900°\ C.)}$ less than 0.025 darcy), of high $EBC_{(900°\ C.)}$ iron content and of small particle size. Calcination thereof according to the prior art produced filtering agents whose characteristics are reported in Table 3-1:

TABLE 3-1

| T° C° | β darcy | Dg g/cm³ | R₅₀ % | EBC iron ppm | BET m²/g | Cristo-balite, % |
|---|---|---|---|---|---|---|
| 600° C. | 0.016 | 0.284 | 1.1 | 258 | 28 | <0.25 |
| 900° C. | 0.023 | 0.270 | 1.5 | 152 | 15 | 15 |
| 1,050° C. | 0.067 | 0.240 | 8 | 160 | 11 | 50 |

Under conditions of agglomeration with silicic acid and employing the activation of Example 2, the results reported in Table 3-2 were obtained:

TABLE 3-2

| % silicic acid | β darcy | Dg g/cm³ | R₅₀ % | EBC iron ppm | SiO₂ from the binder p/100 p | Cristo-balite, % |
|---|---|---|---|---|---|---|
| 0 | 0.016 | 0.285 | 1 | 260 | 0 | <0.5 |
| 20 | 0.050 | 0.250 | 3.5 | 214 | 0.8 | <0.5 |
| 30 | 0.052 | 0.265 | 8 | 290 | 1.4 | <0.5 |
| 40 | 0.090 | 0.245 | 11 | 290 | 1.6 | <0.5 |
| 60[a] | 0.151 | 0.245 | 20 | 290 | 2.8 | 1 |
| 60[b] | 0.100 | 0.295 | 2.5 | 285 | 2.8 | 1 |
| 100[a] | 0.225 | 0.250 | 44 | 290 | 4.7 | 1.5 |
| 100[b] | 0.150 | 0.320 | 15 | 295 | 4.7 | 1.5 |

[a]Product upon removal from the furnace
[b]Same product as a, but after moderate grinding.

This Example plainly illustrates the agglomerating power of silicic acid. It also evidences that, if the product obtained on removal from the furnace[a] has a 50 μm oversize deemed too high by industry standards, it is possible to convert the product[a] by moderate grinding into a product[b] and to lower its oversize without increasing its cake density beyond 0.400 g/cm³. A less effective masking of the iron than in the preceding Examples was noted; this is likely due to the fact that the iron in haematite is more difficult to mask than the iron emanating from clay present in the diatomite. It indeed is easier to block the interflake porosity of clays, and this reduces the extraction of the iron which is confined therein.

EXAMPLE 4

Effect of the Blending Period

The agglomeration of the diatomites by silicic acid has been shown to be very dependent on the blending time. Table 4 below reports the results obtained in the case of a product produced from 30 parts of silicic acid analyzing at 4.25% of SiO₂ per 100 parts of diatomite, the raw material of Example 1.

TABLE 4

| Blending time (min) | β darcy | Dg g/cm³ | R₅₀ % | EBC iron ppm |
|---|---|---|---|---|
| 0 | 0.053 | 0.360 | 10 | 220 |
| 5 | 0.091 | 0.320 | 10 | 154 |
| 10 | 0.105 | 0.326 | 10 | 154 |
| 15 | 0.125 | 0.321 | 8 | 124 |
| 30 | 0.078 | 0.380 | 6 | 166 |
| 60 | 0.078 | 0.390 | 6 | 170 |

The decrease in the 50 μm oversize versus the blending time reflects the more homogeneous distribution of the binder over time.

EXAMPLE 5

Effect of the Preparation of Silicic Acid

In this example the raw material of Example 1 was employed, agglomerated with two types of silicic acid analyzing at 5% of silica SiO₂, one prepared using a Duolite 476 resin (cationic resin of a weak carboxylic acid), the other using Amberlite IR 120 resin (sulfonic cationic resin of a strong acid), in each instance by mixing 40 parts of silicic acid with 100 parts of diatomite. The results obtained are reported in Table 5:

TABLE 5

| Resin employed | β darcy | Dg g/cm³ | R₅₀ % | EBC iron ppm |
|---|---|---|---|---|
| Duolite 476 | 0.080 | 0.350 | 155 | 220 |
| Amberlite IR 120 | 0.180 | 0.330 | 11 | 150 |

It was assumed that when the exchange was carried out using a strong cationic acid resin (R-So₃H), the pH within the exchange column catalyzed initiation of polymerization of the silicic acid, but not to the point of gelling. On Amberlite IR 120 the characteristic pH of the silicic acid exiting the column ranged from 2.4 to 2.7. On carboxylic resins the sodium silicate also exchanges sodium ions, but the silicic acid descends through a weakly acidic column, and this decreases the polymerization of silicic acid; hence, its agglomerating capacity decreases accordingly. The characteristic pH of this different silicic acid ranged from 3 to 3.3.

It should be appreciated that the results were unchanged, employing a potassium silicate instead of a sodium silicate.

EXAMPLE 6

This example illustrates that it is difficult to produce agglomerates calcined only at 600° C. and whose cake density will not be too high.

An agglomerate in accordance with that of Example 1 was produced, except that the silicic acid was replaced with a colloidal silica sol containing 30% of SiO₂. The results obtained are reported in Table 6:

TABLE 6

| % silica sol | β darcy | Dg g/cm³ | R₅₀ % | EBC iron ppm | SiO₂ from the binder % | Cristobalite, % |
|---|---|---|---|---|---|---|
| 0 | 0.030 | 0.362 | 4 | 302 | 15 | <0.25 |
| 10 | 0.029 | 0.417 | 5 | 160 | 3 | <0.25 |
| 20 | 0.057 | 0.430 | 8.3 | 164 | 6 | <0.25 |
| 30 | 0.056 | 0.44 | 12 | 150 | 9 | <0.25 |
| 40 | 0.082 | 0.460 | 15.3 | 144 | 12 | <0.25 |

Comparing these results with those of Example 2, using 12 parts of silica from the silica sol per 100 of diatomite, the permeability only changed to 0.082 darcy, whereas with silicic acid it already was 0.091 with only 0.85 part of silica per 100 parts of diatomite. The cake densities were also clearly higher than those in Example 1. The cristobalite content remained low because the amorphous silica contained in the spherical particles did not crystallize at 600° C.

It will be appreciated that silicic acid is not only much more agglomerating than colloidal silica, but that it is currently five to six times less costly to manufacture.

EXAMPLE 7

The agglomerating power of silicic acid in respect of the diatoms also depends on their surface state. It was found that it was not efficient to agglomerate diatomaceous material which had already been calcined at 600° C. or more. Similarly, a diatomite which had first been contacted with silicic acid and then dried could not be agglomerate further by a second or third impregnation. The Table 7 below reports the results of an agglomeration using a silicic acid containing 4.5% as SiO₂ in a proportion of 20 parts of acid per 100 parts of diatomite, as is or pretreated beforehand. The silicic acid was prepared on Amberlite IR 120. The diatomaceous raw material was that of Example 3.

TABLE 7

| Pretreatment of the diatomite | β darcy | Dg g/cm³ | R₅₀ % | SiO₂ of the binder % |
|---|---|---|---|---|
| Untreated product (A) | 0.012 | 0.289 | 1 | 0 |
| Calcined at 600° C. (A)→(B) | 0.016 | 0.284 | 1 | 0 |
| Product (A) preimpregnated once with silicic acid, dried at 110° C. and calcined at 600° C. (A)→(C) | 0.052 | 0.250 | 3.5 | 0.9 |
| Product (B) calcined at 600° C. preimpregnated with silicic acid dried at 110° C. and calcined at 600° C. (B)→(D) | 0.019 | 0.325 | 3 | 0.9 |
| Product (A) preimpregnated once with silicic acid, dried and impregnated a 2nd time, dried and calcined at 600° C. (A)→(E) | 0.051 | 0.270 | 6 | 1.8 |

If an impregnation with 40 parts of silicic acid per 100 parts of diatomite had been carried out directly, the permeability would have been approximately 0.090 darcy, versus only 0.050 for two successive impregnations with drying therebetween.

EXAMPLE 8

This example illustrates that agglomeration with clays produced unsatisfactory products because of an excessively high cake density, in all instances higher than 0.400 g/cm³.

The method of agglomeration with clays entailed mixing 100 g of water per 100 g of diatomite, introducing the clay and blending in a Werner blender. The paste was dried in an oven and then calcined at 600° C.

Agglomeration using clay binders was not easy because the cake density of the agglomerated products frequently was high in value, greater than 0.400 g/cm³ in all cases, or else, if the densities obtained were low, the 50 μm oversizes were greater than 15% or the permeabilities were close to those of the binder-free products, or even lower. Table 8 below, which reports agglomeration tests using various clays, illustrates that it was very difficult, using agglomeration with clay, to obtain a low cake density (lower than 0.400 g/cm³), a low 50 μm oversize (lower than 15%) and a permeability variation of from 0.035 darcy to 0.4 darcy at the same time. All of the products exemplified were obtained by calcining at 600° C. In certain instances the product was ground to reduce the 50 μm oversize.

TABLE 8

| Clay binder employed | β darcy | Dg g/cm³ | R₅₀ % |
|---|---|---|---|
| Without clay | 0.030 | 0.362 | 4 |
| 5% Kaolin | 0.062 | 0.435 | 63 |
| 10% Kaolin | 0.093 | 0.435 | 66 |
| 15% Kaolin | 0.041 | 0.430 | 64 |
| 5% Attapulgite | 0.024 | 0.390 | 19 |
| 15% Attapulgite | 0.035 | 0.365 | 22 |

TABLE 8-continued

| Clay binder employed | β darcy | Dg g/cm³ | R₅₀ % |
|---|---|---|---|
| 30% Attapulgite | 0.283 | 0.420 | 68 |
| 1% Bentonite | 0.260 | 0.401 | 15 |
| 1% Bentonite; grinding | 0.038 | 0.440 | 5 |
| 5% Bentonite | 0.250 | 0.405 | 40 |
| 5% Bentonite; grinding | 0.073 | 0.470 | 13 |
| 10% Bentonite | 0.310 | 0.325 | 35 |
| 10% Bentonite; grinding | 0.085 | 0.420 | 15 |

EXAMPLE 9

The raw material of Example 1 was agglomerated under the conditions of Example 2 using a sodium silicate aqueous solution. As indicated above, agglomeration by means of sodium silicate can be carried out according to the invention when the leaching of sodium into the filtered liquids is not a problem. This in contradistinction to the technique described in U.S. Pat. No. 5,009,906, where sodium silicate is applied to diatomites calcined beforehand, not as a binder, but as an agent for reducing the content of aluminum values extractable by beer or similar beverages.

The aqueous sodium silicate in this example analyzed at 25.5% of silica and 7.6% of $Na_2O$. This sodium silicate solution was extended with the equivalent of its weight of water; it was employed in a proportion of 20 to 100 parts of diluted solution per 100 parts of diatomite.

The results obtained are reported in the Table below:

TABLE 9

| % sodium silicate | β darcy | Dg g/cm³ | R₅₀ % | EBC iron ppm | SiO₂ from the binder % | Cristo- balite, % |
|---|---|---|---|---|---|---|
| 0 | 0.030 | 0.362 | 4 | 302 | 0 | <0.25 |
| 20 | 0.079 | 0.355 | 8 | 144 | 2.5 | <0.25 |
| 40 | 0.104 | 0.340 | 16 | 180 | 5.0 | <0.25 |
| 60 | 0.143 | 0.320 | 18 | 192 | 7.5 | <0.25 |
| 80 | 0.265 | 0.330 | 19 | 192 | 10.0 | <0.25 |
| 100 | 0.325 | 0.330 | 22 | 216 | 12.7 | <0.25 |

These results evidenced that sodium silicate is an effective binder, permitting the manufacture of products which have cake densities lower than 0.400 g/cm³. The available permeability range was quite wide and the EBC iron was reduced.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of diatomite agglomerates, with a silicic acid binder, having a cristobalite content of less than 1.5% by weight of the agglomerates, a permeability ranging from 20 to 500 millidarcys and a cake density of less than 0.400 g/cm³, comprising homogeneously intimately admixing a diatomite with a binder solution of silicic acid and calcining the agglomerates thus formed at a temperature no greater than 850° C.

2. The process as defined by claim 1, comprising calcining at a temperature no greater than 600° C.

3. The process as defined by claim 1, comprising homogeneously intimately admixing a diatomite with an aqueous solution of silicic acid.

4. The process as defined by claim 3, said silicic acid having been prepared via ion exchange between an alkali metal silicate and a strongly acidic cationic exchange resin.

5. The process as defined by claim 3, wherein the ratio by weight of anhydrous silicic acid binder, expressed as parts of $SiO_2$, per 100 parts of diatomite, ranges from 0.1 to 5.

6. The process as defined by claim 1, comprising drying the agglomerates thus formed prior to the calcination thereof.

7. The process as defined by claim 6, comprising gently grinding the dried agglomerates prior to the calcination thereof.

* * * * *